United States Patent [19]
Dobson et al.

[11] 3,906,869
[45] Sept. 23, 1975

[54] SAFETY DEVICE FOR BANKING VEHICLES

[75] Inventors: Richard N. Dobson, Creemore; John A. Gaiser, Beamsville; Conrad D. Gris, Hamilton, all of Canada

[73] Assignee: Dominion Foundries and Steel, Limited, Hamilton, Canada

[22] Filed: Sept. 16, 1974

[21] Appl. No.: 506,384

[52] U.S. Cl. ............ 105/164; 105/199 A; 105/201
[51] Int. Cl.² .......................................... B61D 01/00
[58] Field of Search........ 105/164, 171, 190 R, 191, 105/199 A, 199 R, 201, 187, 185

[56] References Cited
UNITED STATES PATENTS

| | | | |
|---|---|---|---|
| 3,628,465 | 12/1971 | Dobson et al. | 105/164 X |
| 3,636,886 | 1/1972 | Lich | 105/164 |
| 3,704,670 | 12/1972 | Dobson et al. | 105/201 |
| 3,717,104 | 2/1973 | Law et al. | 105/164 |

*Primary Examiner*—John J. Love
*Attorney, Agent, or Firm*—Stanley J. Rogers

[57] ABSTRACT

A safety device for banking vehicles, specifically for high speed banking railway passenger cars, in which the vehicle body is mounted on a bolster which is tilted relative to its supporting frame for banking purposes. The safety device consists of a spring-actuated ram carried by the frame which is operative on the bolster upon failure of the banking motors and/or upon the presence or detection of any other potentially unsafe condition to centre the bolster to a neutral position and maintain the car upright. The ram is held against such operation by motors fed from the same power source as that supplying the banking motors. The motors holding the ram against operation may be double-acting hydraulic motors that, upon releasing the ram, become "locked-up" in the released condition and act as struts maintaining the bolster in the said neutral position.

10 Claims, 7 Drawing Figures

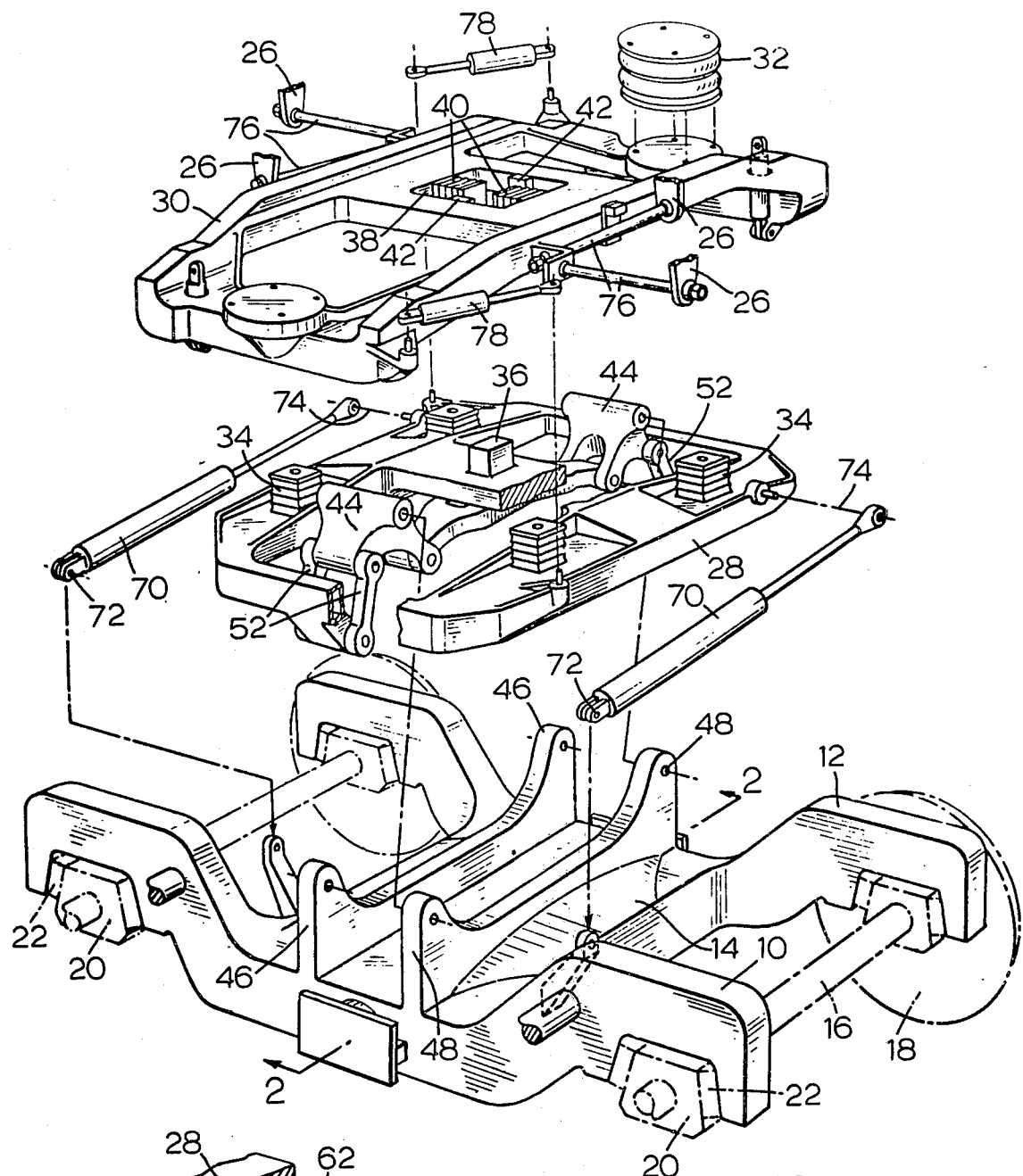
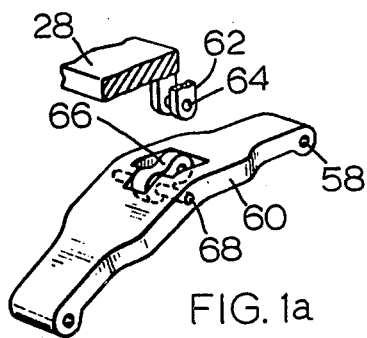
FIG. 1
FIG. 1a

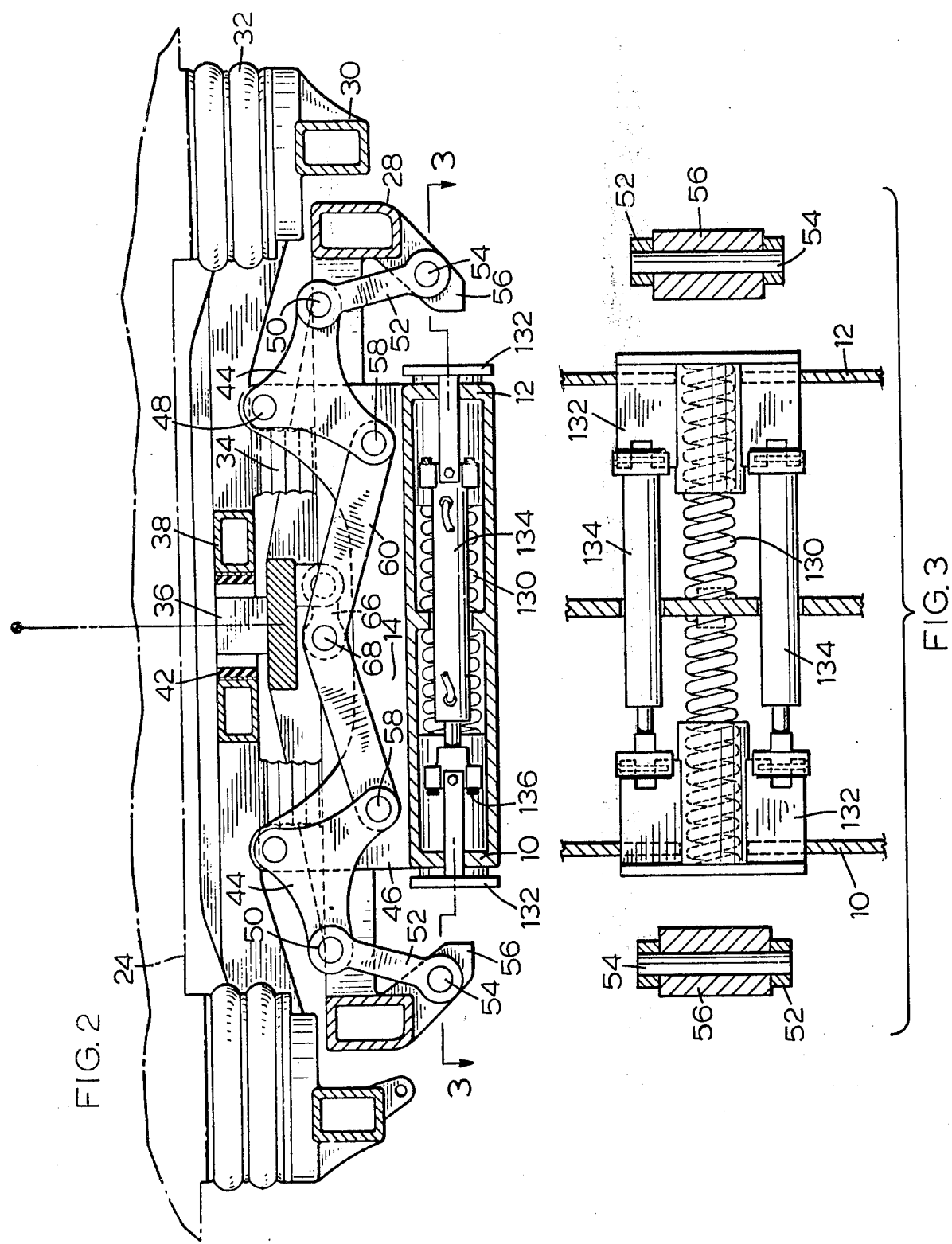

SAFETY DEVICE FOR BANKING VEHICLES

FIELD OF THE INVENTION

This invention is concerned with a safety device for banking vehicles, such as railway vehicles, and especially but not exclusively for such vehicles intended for use in high speed railway passenger cars.

REVIEW OF THE PRIOR ART

It is a continuing requirement for railway vehicles, particularly passenger cars, to achieve higher speeds combined with a safe, comfortable ride, and to this end a number of proposals have been made hitherto to bank the cars by tilting about a longitudinal axis, thereby reducing the lateral force applied to passengers, and permitting higher speeds of operation. There have been disclosed in U.S. Pat. Ser. Nos. 3,628,465 and 3,704,670 issued Dec. 21, 1971 and Dec. 5, 1972 respectively, and assigned to Dominion Foundries and Steel Limited, different railway truck constructions whereby a car body mounted thereon can be tilted under the control of fluid-operated motors, specifically liquid-operated motors. These constructions provide, as far as possible, that the structure and components used in the trucks are the same or very closely similar to those of previously existing vehicles, so that the servicing and maintenance thereof can readily be accomplished with existing railway equipment, shop skills and personnel.

One problem that must be anticipated in any vehicle, and fail-safe arrangements provided therefor, is the partial or total failure of the power supplies. A special problem with a banking vehicle is that such failure may take place while it is in a banked condition. If the vehicle becomes locked in that condition problems will arise with passenger comfort as the vehicle continues. A dangerous condition may arise if one truck of a car is locked in position and the other is not. It is therefore desirable to provide some positive means that will always be effective to restore the truck to a vertical position upon such failure.

SUMMARY OF THE INVENTION

It is an object of the present invention to provide a safety device for banking vehicles such as a railway truck providing for tilting of the car body thereon, particularly such a truck intended for high speed passenger vehicles.

In accordance with the present invention there is provided a safety device for a banking vehicle, the vehicle comprising: a frame; at least two wheel and axle assemblies mounted by the frame and on which the vehicle runs; a bolster member mounted to the frame and adapted to support a vehicle body thereon for pivoting and tilting movement relative to the frame; link mounting means connecting the said bolster member and the frame for said tiling movement of the bolster member relative to the frame; and first motor means connected between the link-connected members and operative upon supply of power thereto from a power source to produce the said tilting movement therebetween, the safety device comprising: a spring-urged device mounted by the frame and operative when effective to oppose tilting of the bolster member and thereby of the vehicle body for maintenance of the body in a vertical position, and second motor means operative together with said first motor means upon supply of power thereto from the same power source to prevent the said effective operation of the spring-urged device.

DESCRIPTION OF THE DRAWINGS

A particular preferred embodiment of the invention will now be described, by way of example, with reference to the accompanying diagrammatic drawings, wherein FIG. 1 is an exploded perspective view of a railway truck with the parts thereof shown displaced vertically relative to one another for clarity of illustration, FIG. 1a is a perspective view of a detail of FIG. 1 that cannot be seen clearly in that Figure, FIG. 2 is a section taken on the line 2—2 of FIG. 1 showing the spring-loaded ram means of the safety device in retracted position, FIG. 3 is a section on the line 3—3 of FIG. 2.

DESCRIPTION OF THE PREFERRED EMBODIMENTS

Figure 4:
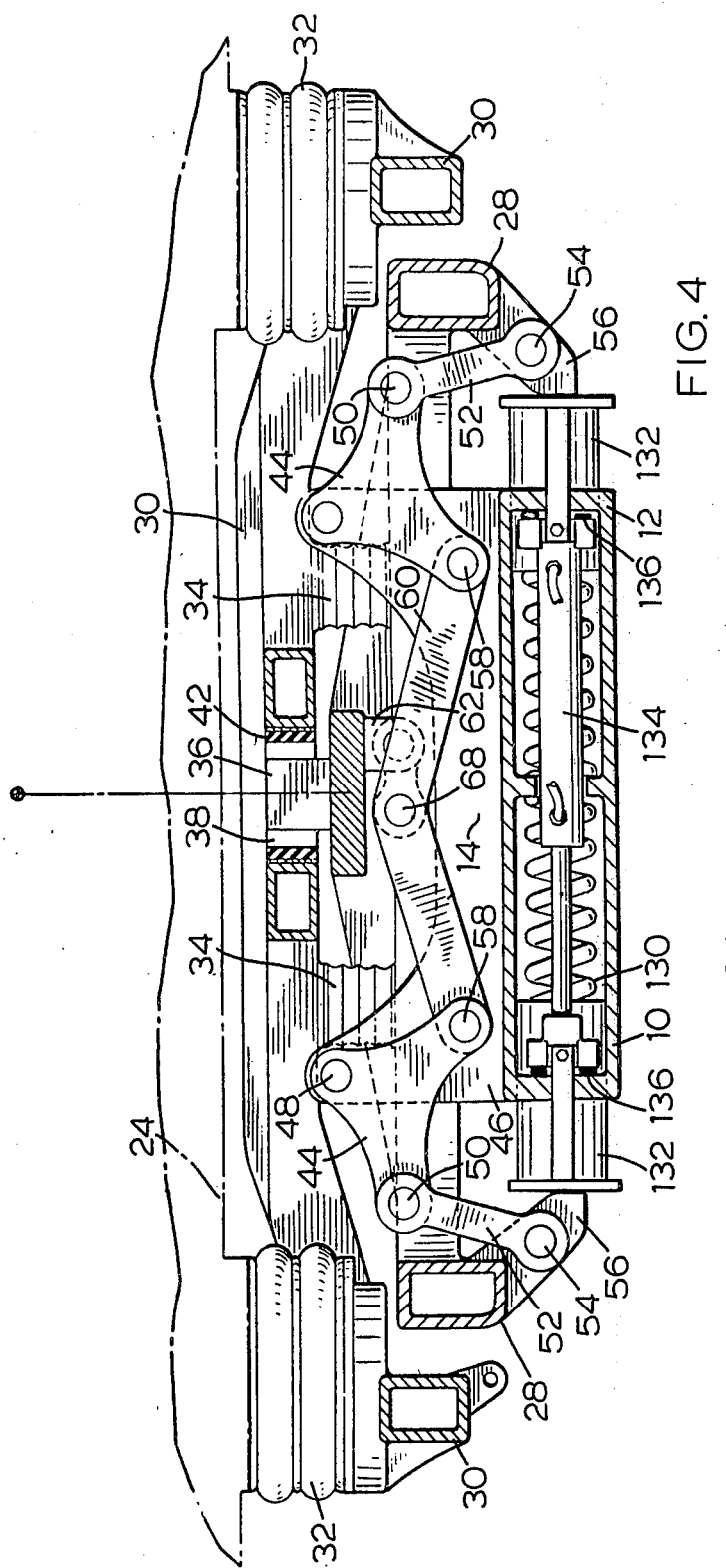
FIG. 4 is a section similar to FIG. 2 and showing the ram means in extended operative position.
Figure 5:
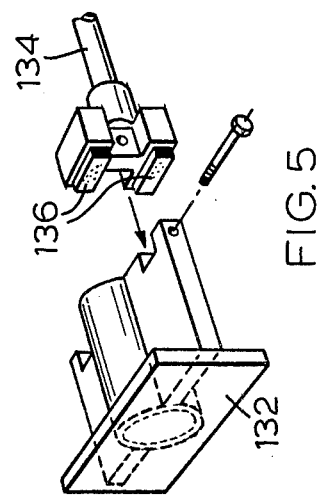
FIG. 5 is a perspective view of one of the ram means ends to show the construction thereof.

Referring now to FIGS. 1 to 5, the particular preferred embodiment illustrated comprises a four-wheel, high-speed passenger truck, having a frame comprising two parallel side frame members 10 and 12. The members have their centre portions depressed, and are connected to one another intermediate their ends by a single central massive transom 14. The truck runs on two similar wheel and axle asemblies, each constituted by a respective axle 16 and a pair of wheels 18. The truck is of course provided with conventional brakes (which are not shown) and may be a motorized unit, in which case each axle will, for example, be driven by a respective electric motor and gear unit (not illustrated) mounted on the frame and operatively connected to the respective axle. The manner in which such motor and gear units (when provided) and the brake units can be mounted in the frame will be apparent to those skilled in the art.

Each axle 16 is rotatably mounted in the frame by a respective pair of journals 20, each of which is mounted and guided for the necessary generally vertical movement by two resilient suspension units 22. The car body that is to be mounted on the truck is indicated diagrammatically as a floor member 24 (FIGS. 2 and 4), having downwardly extending bracket members 26 (FIG. 1) fastened to the underside thereof on either side adjacent each truck. Bolster means for mounting the body on the truck frame comprise lower and upper bolster members 28 and 30 respectively, the lower bolster member 28 being connected to the side frames by a link suspension system, while the upper bolster member 30 is pivotally connected to the lower bolster member and in turn supports the vehicle body 24 via massive laterally-spaced air springs 32.

In this particular embodiment the means pivotally connecting the two bolster members comprise four resilient suspension units 34, disposed at the four corners of a rectangle with their longitudinal compression axes generally vertical. The center portion of the lower bolster is provided with an upwardly-extending spigot 36 that extends into an aperture 38 in the upper bolster 30. In some embodiments it may be preferred to mount the spigot 36 on the upper bolster and have it enter into a corresponding aperture in the lower bolster. The spigot 36 is mounted in the aperture 38 by two opposed longitudinally-spaced resilient suspension units 40; stop members 42 are provided and are engaged by the spigot upon its extreme transverse motion.

Each end of the lower member 28 is connected to the respective truck side frame by an articulated linkage comprising a generally Y-shaped link member 44, which is operative as a bell-crank lever and is pivoted to upstanding lugs 46 on the frame about its crank pivot axis by a pivot rod 48. The end of one crank arm of the link member 44 is connected by a pivot rod 50 to the adjacent ends of two spaced parallel links 52, the other ends of the links 52 being connected by a pivot 54 to lugs 56 extending from the bolster member 28. The ends of the other crank arms of the Y link members 44 are connected by pivot rods 58 to the respective ends of a connecting link 60. The articulated linkage is completed by a depending link 62 (FIG. 1a) fixed rigidly at its upper end to the centre of bolster member 28 and pivoted at its lower end by a rod 64 to one end of a short transverse link 66 that is disposed generally parallel to the connecting link 60 and is accommodated in a recess therein. The other end of the transverse link 66 is connected to the link 60 by a pivot rod 68.

The required rolling or tilting motion of the two bolster parts relative to the frame is produced under the control of first motor means comprising two double acting hydraulic units 70, which are disposed one on each side of the bolster. Each unit 70 is pivotally connected at 72 to the frame and at 74 to the lower member 28. Solid links 76 (FIG. 1) are connected by spherical rubber bushings to the upper bolster 30 and to the brackets 26 fastened to the car floor, while damper units 78 are pivotally connected between the two bolster members.

The action of the connecting linkage in permitting tilting of the bolster member and of the vehicle body mounted thereon will be apparent to those skilled in the art. A detailed explanation thereof is given in the above-identified U.S. Pat. Nos. 3,628,465 and 3,704,670, the disclosures of which are incorporated herein by reference. In all of the figures of the drawings the linkage is shown in its untilted or neutral position in which the vehicle body is vertical.

Figure 6:
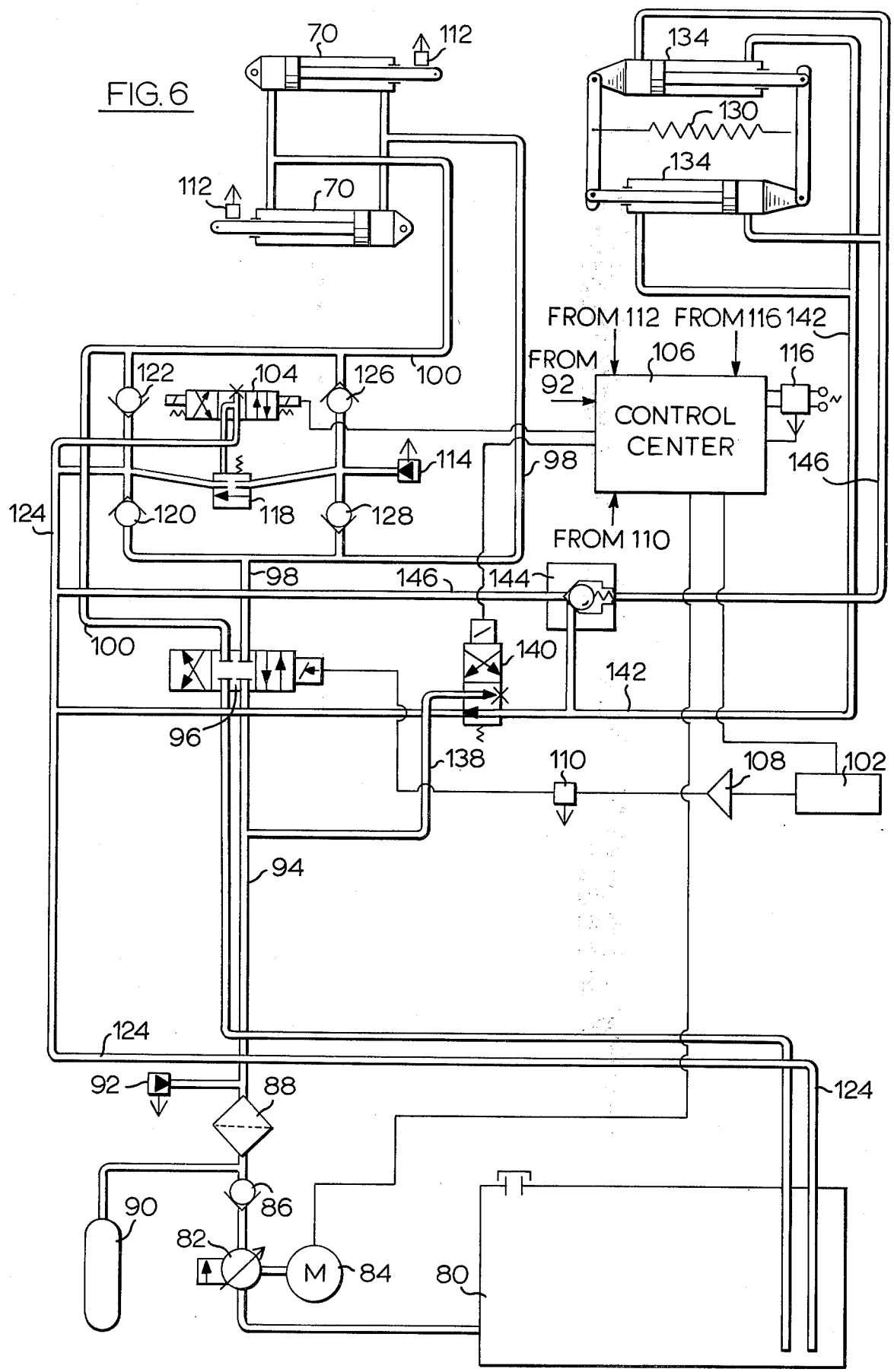
FIG. 6 is a schematic diagram of the electrical and hydraulic operating system for the truck and safety device motors.

Referring now especially to FIG. 6, each of the motor units 70 is supplied with an operating liquid under pressure, usually a suitable oil. This liquid is drawn from a reservoir 80 by a variable displacement pump 82 driven by a motor 84 and fed via a check valve 86 to an accumulator 90. A pressure sensitive switch 92 detects the pump presssure and the fluid passes via a filter 88 and pipe 94 to a solenoid operated valve 96 that feeds the motors alternatively through pipe 98 or pipe 100, depending upon the direction in which the motors are to operate. The pump motor 84, an accelerometer 102 and a solenoid valve 104 are supplied with electric power from a control panel 106. A signal from the accelerometer is fed via an amplifier 108 to the valve 96 and controls the operation of the motors 70 to bank the vehicle body in accordance with the detected conditions.

Upon detection of a fault condition by the detector 92, which in its case will be a reduction in pressure to below a predetermined safe value, and/or the detection of a corresponding condition by any of further detectors 110, 112, 114 and 116 to be described below, the control centre 106 is operative to stop the electric signal normally supplied by the centre to the valve 104, whereupon the valve centres automatically by spring action. Valve 104 has been supplied with liquid from a valve 118 supplied from pipe 98 or pipe 100 via check valves 120 and 122 respectively. When valve 104 centres the valve 118 is connected to return pipe 124 and also centres by spring action and opens. Motors 70 and the liquid under pressure in the reservoir 90 can now relieve via check valves 126 and 128 and the open valve 118 to the return pipe 124, so that the motors are no longer operative.

The detector 110 determines the presence or absence of a control signal from the accelerometer 102. The detectors 112 are responsive to excessive mechanical displacement of their associated motors 70. In some embodiments the outputs from the dectors of one truck may be compared electronically with those from the detectors of the other truck on the same car and a fault signal produced if these differ significantly. The detector 114 measures the pressure of liquid fed to the motor, but may not be considered necessary, and instead or in addition it may be decided to provide a pressure detector between pump 82 and check valve 86, instead of relying upon the detector 92. Failure of electric power to the control panel 106 is detected by detector 116, while failure of electric power to the pump motor will be detected by the consequent loss of pressure to detector 92 (or the other detector mentioned above). In general each designer of a particular system is able to provide any other electric power and fluid pressure detectors that he considers are required.

The detection of a fault condition by any one or more of the detectors indicates the presence of a potentially dangerous situation that is at least alleviated if not completely prevented by the safety device of the present invention. In this embodiment this device is constituted by a pair of massive compression springs 130 interposed between two ram heads 132 mounted for transverse movement in the frame members 10 and 12. These springs 130 urge the heads 132 into contact with projections 56 of the articulated linkage and if unrestrained would prevent the further tilting operation of the linkage and urge the linkage to the neutral position with the car vertical, as illustrated by FIG. 4. Operation of the spring-urged ram heads is prevented under normal operating conditions by two parallel hydraulic motors 134 connected at their ends to the ram heads. As long as these motors are supplied with operating fluid under pressure they are operative to hold the ram heads in the withdrawn position shown in FIG. 2. Movement of the heads to the position of FIG. 4 is cushioned by rubber bumpers 136.

Referring again to FIG. 6, liquid under pressure is supplied from pipe 94 via pipe 138 to a solenoid valve 140 and thence via pipe 142 to the motors 134 to move them to the position shown in FIG. 2. Liquid from the pipe 142 also passes to a controlled check valve 144 which remains in open condition as long as pressurized liquid is fed from the pipe 142. Upon detection of a fault condition by any of the detectors as described above, the supply of electric power to the valve 140 from the control centre ceases and the valve moves under spring action to connect the pipe 142 to the return pipe 124. The same action takes place if the power supply to the valve fails. The supply of pressurized liquid to the motors 134 ceases and the springs 130 now are able to force the ram heads outwards and move the motors 134 to pump liquid from one side of the respective piston along the pipe 142 to the return pipe 124. Liquid is sucked into the motors 134 on the other side of the respective piston along pipe 146 from the return pipe 124 through valve 144 until the heads reach their extreme outermost position. The heads are effectively locked in this position by the liquid-filled motors 134, since the valve 144 prevents reverse flow of liquid, and the locked-up motors therefore reinforce the action of the springs 130. It will be seen therefore that the springs 130 need only be of sufficient size to obtain centering of the link system to its neutral position with the associated car upright, since the maintenance of the system in this neutral position is thereafter performed both by the springs 130 and by the motors 134. Such a lock-up hydraulic motor is almost completely rigid and therefore acts very effectively as a strut or link. It will be seen that operation of the safety device will normally take place upon any failure of the supply of pressurized fluid to the motors 70.

It will be understood by those skilled in the art that the embodiment particularly described above constitutes a specially effective way of applying the safety device of the invention to the railway truck illustrated. In all such vehicles space is at a premium and yet must be found for the relatively massive movable ram and its operating motor or motors without fouling the adjacent structures which may also be moving. Other specific locations and arrangements will therefore be required for other forms of vehicles.

We claim:

1. A safety device for a banking vehicle, the vehicle comprising:
   a frame;
   at least two wheel and axle assemblies mounted by the frame and on which the vehicle runs;
   a bolster member mounted to the frame and adapted to support a vehicle body thereon for pivoting and tilting movement relative to the frame;
   link mounting means connecting the said bolster member and the frame for said tilting movement of the bolster member relative to the frame; and
   first motor means connected between the link-connected members and operative upon supply of power thereto from a power source to produce the said tilting movement therebetween;
   the safety device comprising:
   a spring-urged device mounted by the frame and operative when effective to oppose tilting of the bolster member and thereby of the vehicle body for maintenance of the body in a vertical position,
   and second motor means operative together with said first motor means upon supply of power thereto from the same power source to prevent the said effective operation of the spring-urged device.

2. A device as claimed in claim 1, wherein the said spring-urged device comprises a pair of rams mounted by the frame and spring-urged to move in opposite directions relative to one another, and the second motor means comprise at least one hydraulic motor connected between the rams and operative upon the supply of power thereto to move the rams against such movement by the spring and hold them in inoperative position.

3. A device as claimed in claim 2, wherein the said spring-urged rams are mounted by the frame to move transversely outwardly therefrom upon cessation of supply of power to the second motor means, the rams engaging corresponding parts of the bolster member to centralize it relative to the frame and to hold it against tilting relative thereto.

4. A device as claimed in claim 1, wherein the said first and second motor means are hydraulic motors, wherein said second motor means is at least one double-acting hydraulic motor also connected between the said link-connected members, and wherein upon loss of power from said power source to the last-mentioned motor the motor draws operating liquid into itself through one-way valve means to render the motor effective as a hydraulic strut adapted to maintain the spring-urged device in effective operation upon the link means.

5. A device as claimed in claim 2, wherein the said first and second motor means are hydraulic motors, wherein said second motor means is at least one double-acting hydraulic motor also connected between the said link-connected members, and wherein upon loss of power from said power source to the last-mentioned motor the motor draws operating liquid into itself through one-way valve means to render the motor effective as a hydraulic strut adapted to maintain the spring-urged device in effective operation upon the link means.

6. A device as claimed in claim 3, wherein the said first and second motor means are hydraulic motors, wherein said second motor means is at least one double-acting hydraulic motor also connected between the said lnnk-connected members, and wherein upon loss of power from said power source to the last-mentioned motor the motor draws operating liquid into itself through one-way valve means to render the motor effective as a hydraulic strut adapted to maintain the spring-urged device in effective operation upon the link means.

7. A device as claimed in claim 1, and including a source of hydraulic power supplying the said first and second motor means, and detector means immobilizing the said power source upon detection of conditions requiring application of the safety device to prevent tilting of the vehicle body.

8. A device as claimed in claim 2, and including a source of hydraulic power supplying the said first and second motor means, and detector means immobilizing the said power source upon detection of conditions requiring application of the safety device to prevent tilting of the vehicle body.

9. A device as claimed in claim 3, and including a source of hydraulic power supplying the said first and second motor means, and detector means immobilizing the said power source upon detection of conditions requiring application of the safety device to prevent tilting of the vehicle body.

10. A device as claimed in claim 4, and including a source of hydraulic power supplying the said first and second motor means, and detector means immobilizing the said power source upon detection of conditions requiring application of the safety device to prevent tilting of the vehicle body.

* * * * *